United States Patent Office 3,055,869
Patented Sept. 25, 1962

3,055,869
PROCESS FOR PREPARING POLYESTERS USING FREE ACIDS
Earl W. Wilson and James E. Hutchins, Kingsport, Tenn., assignors to Eastman Kodak Company, Rochester, N.Y., a corporation of New Jersey
No Drawing. Filed Dec. 21, 1959, Ser. No. 860,673
8 Claims. (Cl. 260—75)

This invention relates to an improved method for making low molecular weight polymers such as polyester plasticizers from an aliphatic dicarboxylic acid, a glycol and optionally a chain terminating acid or alcohol. The improvement includes the use of a two component catalyst including an amphoteric metal and an alkali metal.

The polymeric plasticizers having molecular weights of from 800 to 4000 or more have been described in various patents such as U.S. 2,617,779, in the literature and in various copending applications such as Hutchins et al., Serial No. 662,974, filed June 3, 1957 (now abandoned), covering neopentyl glycol polymers, Caldwell Serial No. 662,972, filed June 3, 1957, covering dimethylmalonic acid polymers, Kibler et al., Serial No. 823,297, filed June 29, 1959, covering 1,4-cyclohexanedimethanol polymers, etc. Such polymers can be prepared solely from dicarboxylic acids and glycols or they can be prepared therefrom with the additional use of a monofunctional alcohol or acid as a chain terminator. Such polymers having hydroxyl end groups are useful as intermediates in preparing polyurethane foams as well as for use as plasticizers, etc.

Formation of a polyester by the uncatalyzed reaction of a dibasic acid with a dihydric alcohol, such as neopentyl glycol, often requires a lengthy reaction period. Side reactions and cracking of the polyester result from this extended reaction period at the high temperatures normally employed in polyesterifications. These conditions also induce the formation of polyesters of dark color, a factor which limits their usefulness.

The polyesterification reaction may be shortened considerably by the use of conventional, acid-type esterification catalysts. However, there are two major objections to their use. They impart to the finished product certain undesirable properties such as high acid values, high color, and unsatisfactory mechanical and electrical properties. The acid-type catalysts are also difficult to remove after the reaction is complete. As a result, these catalysts are not generally employed in commercial direct-esterification processes.

According to published literature, linear polyesters usually are prepared by a method of transesterification, a more economical process than the direct method when the required reaction periods are considered. Many references are made to the use of various catalysts, generally of a metallic type, in the transesterification process. However, these catalysts, with the exception of certain amphoteric compounds, are indicated to have little or no catalytic activity in direct esterification reactions.

It is an object of this invention to provide an improved process for preparing polyesters. A further object is to provide novel catalytic compositions for such a process. Other objects will be apparent elsewhere herein.

According to a preferred embodiment of this invention there is provided a process for preparing a linear polymer of an aliphatic dicarboxylic acid and a glycol comprising heating (A) an aliphatic dicarboxylic acid with (B) a glycol in the presence of a catalytic amount of (1) an organometallic compound selected from the group consisting of the alkylated (1–20 carbons) oxides and neutral and basic salts of aluminum and tin as aliphatic monobasic and dibasic acid (1–20 carbons) salts and (2) an alkali metal compound selected from the group consisting of hydroxides, alkoxides (1–20 carbons) and salts of aliphatic monobasic and dibasic acids (1–20 carbon atoms).

The polymer preparation may also include as a third component (C) a monofunctional chain terminator selected from the group consisting of monobasic acids and monohydric alcohols, each preferably having from 4 to 40 carbon atoms. Components (A) and (B) preferably have from 2 to 40 carbon atoms; generally component (B) has a maximum of 20 carbon atoms.

The catalytic amounts used preferably range from 0.001% to 3% by weight based on the total reaction mixture (A, B and C, if any). An especially advantageous proportion of catalyst components is 0.03% to about 0.10% by weight of component (2) and component (1) is from 25% to 50% by weight of component (1) whereby unobviously surprising results are achieved according to this invention.

The use of aluminum and other such amphoteric metals has been cited in the literature as ester interchange catalysts. This phenomenon of ester interchange is characterized by the reaction of a di-ester of a dicarboxylic acid with a glycol resulting in the elimination of the monohydric alcohol to produce a linear polyester. This reaction is sometimes an extenuation of the esterification process wherein a low molecular weight polyester is reacted with glycol in the manner previously cited but a glycol is eliminated to build up a higher molecule weight change. The use of aluminum alcoholates has been reported in the literature. For example, Rehburg and Fisher, J.A.C.S., 66, 1203, 1944, cite the use of aluminum alcoholates as alcoholysis catalysts in the preparation of some polymeric materials.

All of this prior work shows that it is most advantageous by prior art techniques to prepare a simple ester of the dibasic acid and then react this simple ester with the glycol to prepare the polyester. The instant invention circumvents this step of preparing the simple ester whereby the polyester may be prepared directly from the dicarboxylic acid and the glycol. The Newby patent, British 733,870, has shown that esters may be prepared from anhydrides of dibasic carboxylic acids and alcohols using as a catalyst a mixture of compounds of amphoteric metals and alkaline substances. However, in this patent it is specifically stated that the starting point for the acid is the anhydride. This eliminates from use in polyesters many dicarboxylic acids which do not readily form anhydrides. The present invention further improves and develops the use of particular catalysts to the point that a polyester can be prepared directly from a dibasic acid and a glycol in a very advantageous process.

Historically, the best catalyst systems have been those which were acidic in nature. Such compounds as sulfuric acid, paratoluene sulfonic acid, and various alkylated sulfonic acids have been widely used as catalyst systems. Also, widely used in the prior art are acidic salts such as zinc chloride and aluminum chloride. However, these materials, although suited for use with many glycols, are not suited for certain materials which are known to degrade in the presence of highly ionic substances. Notably among such compounds stands 2,2-dimethyl propanediol. Under conditions of high temperature, in the presence of such ionic substances, this glycol has a tendency to split out or break down into formaldehyde, isobutyraldehyde and their derivatives. For this reason, such catalysts systems as are set forth according to the present invention are especially important in preparation of neopentyl glycol polyesters. Although branched chain glycols are often subject to ionic degradation, they become stable when converted into polyesters according to the present invention.

In the practice of this invention, we have found that the use of an alkaline metal salt enhaces the catalytic effect of the amphoteric metals. The effects of using or omitting the catalysts of this invention are demonstrated by the following illustrative examples.

EXAMPLE I—NO CATALYST

A two liter, 3-neck flask was equipped with a thermometer, mechanical stirrer, water separator, and reflux condenser. The flask was charged with 4.5 moles (468 grams) of neopentyl glycol and 3 moles (438 grams) of adipic acid. The temperature was increased until it had reached 220° C. The temperature was then held at this point throughout the course of the reaction. As soon as the ingredients had reached the liquid state, agitation was started. Samples were taken from the mass at regular intervals so that the percent acid might be calculated. This was taken as a measure of the progress of the reaction. The following table demonstrates the results of this example:

| Time, hrs.: | Percent acid as adipic |
|---|---|
| 0 | 29.74 |
| 1 | 5.00 |
| 2.5 | 2.50 |
| 3 | 2.15 |
| 4 | 1.80 |
| 5 | 1.60 |
| 6 | 1.40 |
| 22 | 0.99 |
| 24 | 0.88 |
| 27 | 0.90 |
| 30 | 0.87 |

This example demonstrates the behavior of an uncatalyzed reaction. Additional examples are now to be given demonstrating the behavior when various catalytic substances of this invention are added to the system.

EXAMPLE II.—Al+Na CATALYTIC COMPOUNDS

The esterification was conducted in the manner and according to the procedure outlined in Example I. However, in this case there were added 2.72 grams of basic aluminum acetate and 0.91 gram of sodium acetate. Addition of the catalyst was made when the melt had reached the temperature of 170° C., and zero time was taken five minutes after catalyst addition. The following demonstrates the progress of this reaction.

| Time, hrs.: | Percent acid as adipic |
|---|---|
| 0 | 29.21 |
| 1.0 | 2.81 |
| 1.5 | 2.44 |
| 3.0 | 0.92 |
| 4.0 | 0.67 |
| 5.0 | 0.56 |
| 6.5 | 0.42 |
| 22.0 | 0.09 |
| 24.0 | 0.05 |
| 27.0 | 0.03 |
| 30.0 | 0.04 |

The practice of this invention is further illustrated by the use of a lithium acetate. This is shown in the next example.

EXAMPLE III.—Al+Li CATALYTIC COMPOUNDS

The reaction procedure and conditions were identical with those outlined in Example I with the exception of the catalysis. The catalyst was added as indicated in Example II using 2.72 grams of basic aluminum acetate and 0.91 gram of lithium acetate. The progress of this reaction is shown in the following table.

| Time, hrs.: | Percent acid as adipic |
|---|---|
| 0 | 28.9 |
| 1.0 | 1.62 |
| 2.0 | 1.06 |
| 3.0 | 0.76 |
| 5.0 | 0.58 |
| 7.0 | 0.34 |

To demonstrate the above interaction of the amphoteric catalyst with the alkaline catalysts the following Examples IV and V are cited to show the effect of using only one catalytic component.

EXAMPLE IV.—Al COMPOUND ALONE

The procedure was that as described in Example II except that 2.72 grams of basic aluminum acetate was added as the sole catalyst. The following is a table of the progress of this reaction.

| Time, hrs.: | Percent acid as adipic |
|---|---|
| 0 | 26.24 |
| 5.0 | 1.06 |
| 3.0 | 1.73 |
| 22.0 | 0.60 |
| 30.0 | 0.57 |

The lack of catalysis by the sodium acetate is demonstrated by the following example:

EXAMPLE V.—Na COMPOUND ALONE

Reaction conditions and procedure were as indicated in Example II except that 1.62 grams of sodium acetate were added as the sole catalyst. The reaction proceeded as follows:

| Time, hrs.: | Percent acid as adipic |
|---|---|
| 0 | 27.8 |
| 2 | 1.44 |
| 6 | 0.65 |
| 24 | 0.38 |

After 30 hours the use of sodium acetate as the catalyst is capable of reducing the acid concentration to less than 0.3% but by using it in conjunction with an alkaline catalyst as in Examples II and III the concentration is less than 0.1% in 30 hours.

In the practice of this invention, one can employ an amphoteric metal concentration of 0.03% to about 0.10% and an alkali metal salt concentration from 25% to 50% of the weight of the amphoteric metal compound. This catalyst may be added before reaction is initiated or it may be added in the early stages of the reaction.

The practice of the invention also can be carried out by the use of a dicarboxylic acid, a glycol and a terminating monocarboxylic acid or monohydric alcohol, with the above described catalyst system, to form a linear polyester.

The following reactions were carried out to demonstrate the use of tin as the amphoteric metal constituents in the practice of this invention.

EXAMPLE VI.—Sn COMPOUND ALONE

The reaction conditions and procedure were as indicated in Example IV except that 0.79 gram of stannous oxalate were used. The reaction proceeded as follows:

| Time, hrs.: | Percent acid as adipic |
|---|---|
| 0 | 26.89 |
| 2 | 0.69 |
| 4 | 0.54 |
| 6 | 0.50 |
| 24 | 0.54 |
| 28 | 0.49 |
| 30 | 0.51 |

The use of an alkaline salt along with the stannous oxalate is demonstrated by the following examples:

EXAMPLE VII.—Sn+Na CATALYTIC COMPOUNDS

The reaction conditions and procedure were as indicated in Example II except that 0.79 gram of stannous oxalate and 0.26 gram of sodium acetate were used as catalysts. The reaction proceeded as follows:

| Time, hrs.: | Percent acid as adipic |
|---|---|
| 0 | 27.46 |
| 2 | 0.68 |
| 5 | 0.40 |
| 7 | 0.32 |
| 24 | 0.26 |
| 28 | 0.28 |

EXAMPLE VIII.—Sn+Li CATALYTIC COMPOUNDS

The reaction conditions and procedure were as indicated in Example II except that 0.79 gram of stannous oxalate and 0.26 gram of lithium acetate were used as a catalyst. The reaction proceeded as follows:

| Time, hrs.: | Percent acid as adipic |
|---|---|
| 0 | 30.0 |
| 2 | 0.72 |
| 4 | 0.46 |
| 7 | 0.30 |
| 24 | 0.092 |
| 28 | 0.066 |
| 30 | 0.056 |

These additional examples demonstrate that amphoteric metals, along with alkali metal salts, are useful in the practice of this invention. Just as aluminum was used in earlier examples, the latter ones demonstrate that tin can be used.

In some instances oxides may be used in lieu of the salts. This is demonstrated by the following examples.

EXAMPLE IX.—Sn COMPOUND ALONE

The reaction condition and procedure were the same as Example IV except that 1.53 grams of dibutyl tin oxide were used as the sole catalyst. The reaction proceeded as follows:

| Time, hrs.: | Percent acid as adipic |
|---|---|
| 0 | 27.14 |
| 1 | 1.23 |
| 2 | 0.86 |
| 4 | 0.60 |
| 6 | 0.56 |
| 23 | 0.58 |
| 26 | 0.60 |
| 30 | 0.70 |

EXAMPLE X.—Sn+Na CATALYTIC COMPOUNDS

The reaction condition and procedure were the same as Example II except that 1.53 grams of dibutyl tin oxide and 0.51 gram of sodium acetate were used. The reaction proceeded as follows:

| Time, hrs.: | Percent acid as adipic |
|---|---|
| 0 | 27.73 |
| 1¾ | 0.77 |
| 4 | 0.79 |
| 6 | 0.59 |
| 24 | 0.12 |
| 27 | 0.071 |
| 30 | 0.078 |

The following table summarizes the reactions recorded in these examples:

Catalyst Activity in the Preparation[1] of Poly[Neopentyl Adipate]

| Example | Catalyst[2] | Reaction Time, Hrs. To Reach Acid Concentration[3] of— | | | | Minimum Acid Concentration[3] After 30 Hrs. |
|---|---|---|---|---|---|---|
| | | 5.0 | 1.0 | 0.5 | 0.1 | |
| I | None | 1.0 | 14 | (4) | (4) | 0.87 |
| II | Al[OH][OCOCH$_3$]$_2$+NaOCOCH$_3$ [3:1] | 0.5 | 3.0 | 5.6 | 17 | 0.04 |
| III | Al[OH][OCOCH$_3$]$_2$+LiOCOCH$_3$ [3:1] | 0.3 | 2.0 | 5.0 | | [5]0.34 (7 hrs.) |
| IV[6] | Al[OH][OCOCH$_3$]$_2$ | 1.0 | 5.5 | (4) | (4) | 0.57 |
| V[6] | NaOCOCH$_3$ | 0.8 | 3.5 | 10.0 | (4) | |
| VI[7] | SnC$_2$O$_4$ | 0.2 | 0.8 | 6.0 | (4) | 0.51 |
| VII | SnC$_2$O$_4$+NaOCOCH$_3$ [3:1] | 0.2 | 0.8 | 3.5 | (4) | 0.26 |
| VIII | SnC$_2$O$_4$+LiOCOCH$_3$ [3:1] | 0.2 | 1.5 | 3.8 | 19.5 | 0.056 |
| IX[6] | Sn[C$_4$H$_9$]$_2$O | 0.2 | 2.0 | (4) | (4) | 0.70 |
| X | Sn[C$_4$H$_9$]$_2$O+NaOCOCH$_3$ [3:1] | 0.3 | 1.7 | 6.0 | 28 | 0.08 |

[1] Reactants: 4.5 moles of neopentyl glycol, 3.0 moles of adipic acid.
[2] Catalyst concentration: 0.05% metal. When a second compound was used, it was in addition to the primary catalyst at the indicated weight ratio.
[3] Acid concentration expressed as percent adipic acid.
[4] Not achievable even in 30 hours.
[5] Probably well under 0.1%.
[6] Examples for comparison; not part of invention.
[7] This Example VI is set forth in continuation-in-part Serial No. 183,316, filed February 23, 1962.

The above table shows the value of Al and Sn combination catalysts according to this invention. The use of antimony is excluded because it produces a hazy polyester as is shown in its performance. Although Sn and Al are both encompassed by this invention it is not to be considered that they are equivalent in all respects nor that the utility of one renders the other obviously useful. The alkali metals include Na, Li, K, Cs and Rb.

Examples of the constituents which constitute the polymers which can be prepared according to this invention include constituents designated above as (A), (B) and (C) as follows:

(A) DIBASIC CARBOXYLIC ACIDS

These include primarily the aliphatic acids although aromatic, heterocyclic and other types are contemplated in minor proportions. Examples include terephthalic, cyclohexanedicarboxylic, succinic, naphthalenedicarboxylic, norcamphanedicarboxylic, carbonic, dimerized fatty acids, trimerized fatty acids, p-carboxycarbanilic, suberic, azelaic, adipic, sebacic, glutaric, dimethylmalonic, α-ethylsuberic, oxalic, α,α-diethyladipic, dicarboxy diethyl ether, ortho-phthalic, hexahydro-o-phthalic, sulfonyldipropionic, and many other such acids. Examples of the especially preferred aliphatic dicarboxylic acids include adipic, succinic, azelaic, suberic, sebacic, glutaric, pimelic, dimethylmalonic and other straight or branched chain acids having from 4 to 12 carbon atoms.

(B) DIHYDROXY COMPOUNDS

These include aromatic, aliphatic, heterocyclic, and other types as in regard to constituent (A). Preferably the hydroxy radicals are attached to a methylene group as in a glycol, i.e., the compound is a dihydroxymethyl compound such as ethylene glycol, 1,10-decanediol, neopentyl glycol, 1,4-bishydroxymethylbenezene, norcamphanedimethanol, etc. Other dihydroxy compounds include hydroquinone, dihydroxynaphthalene, resorcinol, etc. Such compounds generally contain from 2 to 20 carbon atoms if they are monomeric in nature; however, the dihydroxy compounds contemplated also include the polyethylene glycols, other low polymers which are bifunctional and may contain internal ether, thioether, sulfone, carboxy, urethane and other linkages. Further specific examples include 2-methyl-1,5-pentanediol, diethylene glycol, triethylene glycol, 2,2-diethyl-3-isopropyl-1,3-propanediol, etc. It is preferred that constituent (B) is an aliphatic glycol, especially neopentyl glycol or 1,4-cyclohexanedimethanol. The especially preferred glycols contain from 2 to 12 carbon atoms.

(C) CHAIN TERMINATOR

These include monobasic acids and monohydric alcohols containing from 4 to 40 carbon atoms and are preferably aliphatic in character. Examples of alcohols include 2-ethylhexanol, 2,2-dimethylpentanol, 2,2,4-trimethylpentanol, lauryl alcohol, decanol, etc. Examples of acids include 2-ethylhexanoic acid, pelargonic acid, neofat acids, caproic acid, etc.

The process of the present invention except for the improved catalyst is well known in the art and is generally set forth in many patents. A copending application by co-workers in the same laboratories with the inventors discusses this in great detail, viz. Caldwell, Serial No. 662,972, filed June 3, 1957.

As has already been made plain, this invention in its preferred form relates to low molecular weight (800 to 8,000) aliphatic polyesters prepared from aliphatic free acids (not anhydrides) using novel combination catalysts in certain preferred ratios whereby the dicarboxylic acid concentration after reacting (A) and (B) for 5 hours is less than 0.6% and for 30 hours is preferably less than 0.1% but not more than 0.3%. An especially preferred process excludes Example VII which is indicative of the unpredictability and empirical nature of inventions involving catalytic action. When polymeric plasticizers are being produced by the process of the invention in one of its most preferred embodiments there is present a chain terminator during the reaction. The process of this invention is not to be confused with preparation of high molecular weight polyesters (10,000 to 100,000) which are useful in fibers for fabrics, films, etc.

In addition to the use of these catalysts for the preparation of saturated, linear polyesters, they may be used in the preparation of certain unsaturated polyesters. In this type of preparation, however, it is not customary to go to the very low acid numbers that are often encountered in the saturated type. It is, nevertheless, important that a low acid number be achieved in a minimum period of time. This is to prevent the unnecessary exposure of the unsaturated polyester to an extended heat history. It is not uncommon, in exposure to a prolonged heat history, to have a cross-linking of the unsaturated chains and thus increase their molecular weight disproportionate to the polyester condensation. A typical preparation of an unsaturated polyester is demonstrated by the following example:

EXAMPLE XI

A two liter, three-necked flask was equipped with thermometer, mechanical stirrer, water separator, and reflux condenser. The flask was charged with five moles (380 grams) of propylene glycol, two moles (332 grams) of isophthalic acid, and two moles (232 grams) of fumaric acid. The temperature was raised and as soon as the melt had been achieved, the system was catalyzed with 0.82 gram of stannous oxylate and 0.27 gram sodium acetate. The progress of the reaction is shown by the following table:

| Time, Hours | Acid Number | Percent Acid As Isophthalic |
|---|---|---|
| 3 | 26.7 | 39.4 |
| 6 | 19.1 | 28.2 |
| 8 | 11.0 | 16.3 |
| 11 | 4.8 | 7.1 |

The invention has been described in detail with particular reference to preferred embodiments thereof, but it will be understood that variations and modifications can be effected within the spirit and scope of the invention as described hereinabove and as defined in the appended claims.

We claim:

1. A process for preparing a nonfiber-forming linear polyester having a maximum free dicarboxylic acid concentration of 0.3 percent by weight and having a molecular weight ranging from 800 to 8,000 starting with a free dicarboxylic acid comprising heating at a temperature of at least 170° C. (A) a dicarboxylic acid consisting essentially of an aliphatic acid having from 4 to 12 carbon atoms and (B) a dihydroxy compound containing from 2 to 20 carbon atoms consisting essentially of an aliphatic glycol in the presence of from 0.001 to 5% by weight based on (A) and (B) of a catalyst composition selected from the group consisting of (*a*) basic aluminum acetate and sodium acetate, (*b*) basic aluminum acetate and lithium acetate, (*c*) stannous oxalate and lithium acetate, (*d*) stannous oxalate and sodium acetate, and (*e*) dibutyl tin oxide and sodium acetate, the proportion of the second constituent in each of these catalyst compositions being from 25% to 50% by weight of the first constituent.

2. A process as defined by claim 1 wherein said heating of (A) and (B) includes the presence of up to 60 mole percent based on (A) of (C) a chain terminator selected from the group consisting of monobasic acids and monohydric alcohols containing from 4 to 40 carbon atoms.

3. A process as defined by claim 1 wherein (A) is adipic acid and (B) is neopentyl glycol.

4. A process as defined by claim 3 wherein the catalyst is basic aluminum acetate and sodium acetate.

5. A process as defined by claim 3 wherein the catalyst is basic aluminum acetate and lithium acetate.

6. A process as defined by claim 3 wherein the catalyst is stannous oxalate and lithium acetate.

7. A process as defined by claim 3 wherein the catalyst is dibutyl tin oxide and sodium acetate.

8. A process as defined by claim 3 wherein the catalyst is stannous oxalate and sodium acetate.

References Cited in the file of this patent

UNITED STATES PATENTS

| | | |
|---|---|---|
| 2,249,950 | Fuller | July 22, 1941 |
| 2,578,660 | Auspos et al. | Dec. 18, 1951 |
| 2,720,506 | Caldwell et al. | Oct. 11, 1955 |
| 2,720,507 | Caldwell | Oct. 11, 1955 |